United States Patent
Hihara et al.

[11] Patent Number: 5,110,084
[45] Date of Patent: May 5, 1992

[54] FORM DEVICE FOR CELLULAR CONCRETE AND METHOD OF MAKING SUCH CONCRETE

[75] Inventors: Mikio Hihara; Nobuhisa Suzuki, both of Fuji, Japan

[73] Assignee: Nissei Plan, Inc., Sizuoka, Japan

[21] Appl. No.: 234,945

[22] Filed: Aug. 22, 1988

[30] Foreign Application Priority Data

Jun. 10, 1988 [JP] Japan .................. 63-143075
Jun. 10, 1988 [JP] Japan .................. 63-143076

[51] Int. Cl.⁵ .................. B28B 1/50; B28B 7/26
[52] U.S. Cl. .................. 249/111; 249/126; 249/129; 249/135; 264/297.9; 264/333; 264/DIG. 43
[58] Field of Search .................. 249/79, 80, 81, 126, 249/160, 165, 43, 55, 91, 129, 90, 111, 134, 135; 264/297-299, 333, DIG. 43

[56] References Cited

U.S. PATENT DOCUMENTS

| | | | |
|---|---|---|---|
| 2,257,377 | 9/1941 | Haben | 249/126 |
| 2,678,143 | 5/1954 | Dillingham et al. | 249/126 |
| 2,886,876 | 5/1959 | Wilson | 249/79 |
| 3,441,243 | 4/1969 | Walz | 249/81 |
| 3,891,178 | 6/1975 | Kelsey | 249/91 |
| 4,146,599 | 3/1979 | Lanzetta | 249/55 |
| 4,402,484 | 9/1983 | Kataishi et al. | 249/129 |
| 4,508,308 | 4/1985 | Rossin et al. | 249/90 |
| 4,598,519 | 7/1986 | Reid | 249/43 |

FOREIGN PATENT DOCUMENTS

| | | | |
|---|---|---|---|
| 1584408 | 2/1970 | Fed. Rep. of Germany | 264/297.9 |
| 2036711 | 12/1970 | France | 249/126 |
| 2495996 | 6/1982 | France | 249/126 |
| 212812 | 5/1968 | U.S.S.R. | 249/79 |
| 528205 | 10/1976 | U.S.S.R. | 249/79 |
| 613902 | 7/1978 | U.S.S.R. | 249/126 |
| 874364 | 10/1981 | U.S.S.R. | 249/126 |
| 1074981 | 2/1984 | U.S.S.R. | 249/79 |
| 1187997 | 10/1985 | U.S.S.R. | 249/126 |

Primary Examiner—Jeffery Thurlow
Assistant Examiner—Mathieu Vargot
Attorney, Agent, or Firm—Wenderoth, Lind & Ponck

[57] ABSTRACT

A form device for cellular concrete, including a number of piled-up form units having a heat-insulating bottom and shell, a heat-insulating top board, and a bottom-to-shell joint. A cellular concrete manufacture is produced by mixing cement with warm water at a temperature of 40° to 75° C. to form a warm cement mortar, mixing the mortar with a bubbled warm frother solution to form a warm cellular concrete paste, and hardening the paste using such heat-insulating form device.

2 Claims, 3 Drawing Sheets

FORM DEVICE FOR CELLULAR CONCRETE AND METHOD OF MAKING SUCH CONCRETE

BACKGROUND OF THE INVENTION

I. Field of the Invention

The present invention relates to a form device for cellular concrete manufactures, and the method of making such manufactures. More particularly the present invention relates to a form device having a number of piled-up form units with a heat-insulating bottom and shell, a heat-insulating top board, and a bottom-to-shell joint. And also, the present invention relates to a process for producing cellular concrete, comprising of mixing cement with warm water at temperatures between 40° and 75° C. to form a warm cement mortar; mixing the mortar with a bubbled warm frother solution to form a warm cellular concrete paste; and hardening the paste using such form device.

II. Description of the Related Art

The light weight, heat insulation, fire resistance, and sound insulation of cellular concrete manufacture have allowed it to find a definite niche in the field of building material.

The process of producing cellular concrete manufacture is generally divided into two: (1) to make a cement mortar foam in a form after mixing all the ingredients and (2) to mix a cement mortar with a bubbled frother solution, followed by casting this cellular concrete paste into a form to solidify. The latter method is widely used since it can make it easy to manufacture the desired form of cellular concrete. The present invention relates to this process.

The increasing demands of cellular concrete have made it urgent that the industry find rapid means for manufacturing this cellular concrete at lower costs. For this reason, the use of early-strength cement or a process of hardening cellular concrete in a room having a temperature higher than ordinary has been proposed, to shorten the hardening time. However, these processes have not been capable of satisfactorily the production costs of cellular concrete manufactures. The cost of early-strength cement is still expensive. And also, the construction of the housing to keep the cellular concrete at higher temperatures requires much money, for example, the costs of construction for housing and fuel for heating can not be ignored.

SUMMARY OF THE INVENTION

In accordance with the present invention, a process and device of rapid by producing cellular concrete manufactures are provided.

In the process according to this invention, cement and warm water are mixed often together with other additives such as aggregates at a higher temperature of 40° to 75° C. to form a warm cement mortar The mortar is blended with a bubbled warm frother solution to form a warm cellular concrete paste. The paste is immediately transferred into a form of the invention to solidify; the form has a heat-insulating bottom and shell. A number of such forms are piled up and covered with a heat-insulating top board, to retain the temperature higher. The additional addition of a compound capable of undergoing exothermic reactions with water or oxygen is also effective on keeping the temperature of the cellular concrete in the form higher.

DESCRIPTION OF THE PREFERRED EMBODIMENTS

The following examples are illustrative and represent preferred embodiments of form device of the invention, and process of making cellular concrete using such device.

The drawings given in FIGS. 1 to 4 represent preferred embodiments of the form device of the invention for the rapid production of cellular concrete manufactures.

Figures 1, 2:
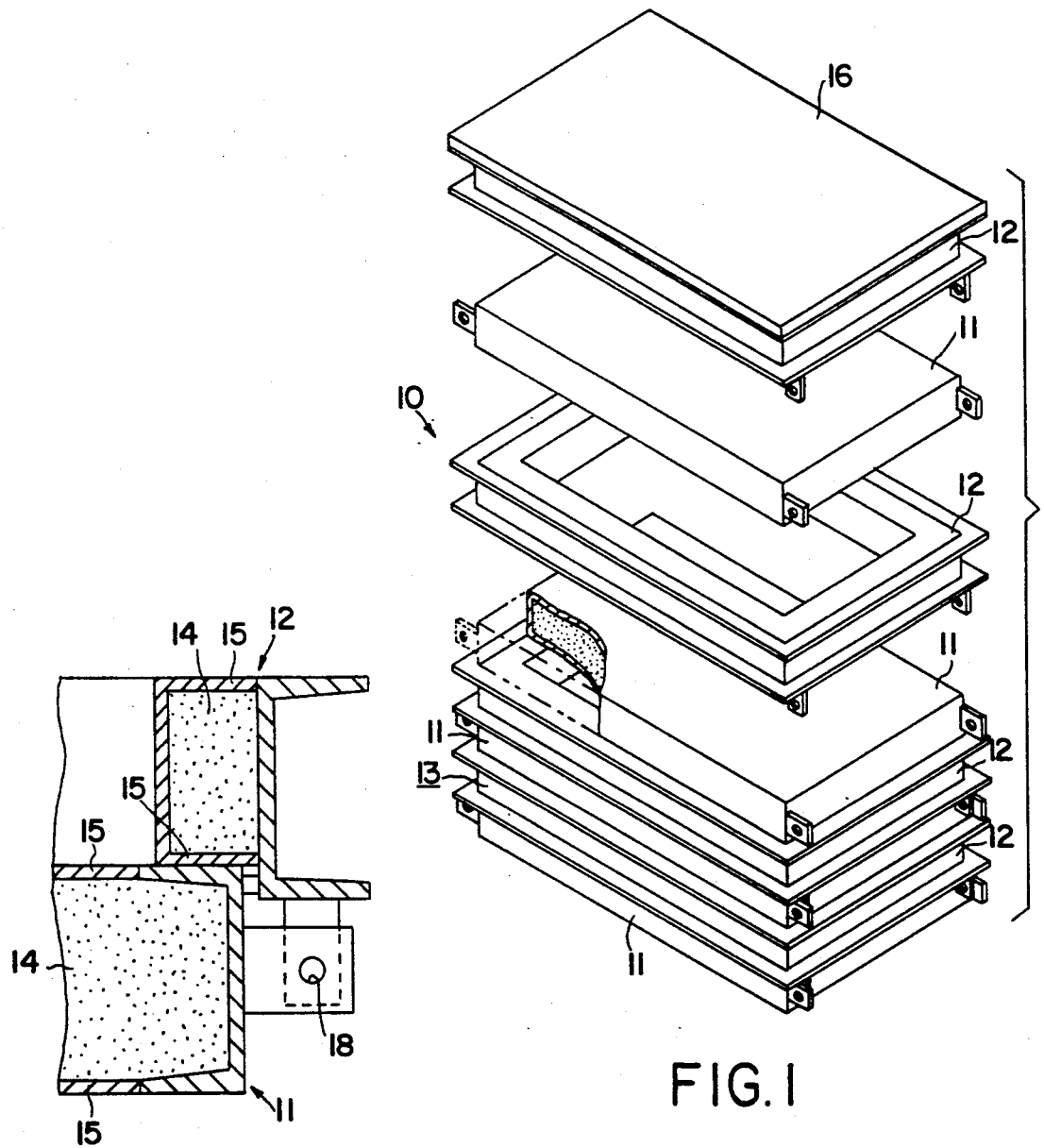
FIG. 1 illustrates a schematic drawing of form device of the invention.
FIGS. 2 and 3 represent sketch drawings of heat-insulation and bottom-to-shell joints.

In FIG. 1, the reference number 10 designates a form device of the invention; 11 a heat-insulating bottom board; 12 a heat-insulating shell board; 13 a form unit; and 16 a heat-insulating top board.

In FIG. 2, the reference number 11 designates a bottom board; 12 a shell board; 14 a heat-insulating material such as foam plastic board; 15 a lagging material such as metal; and 18 a hole for bottom-to-shell joint.

Figure 3:
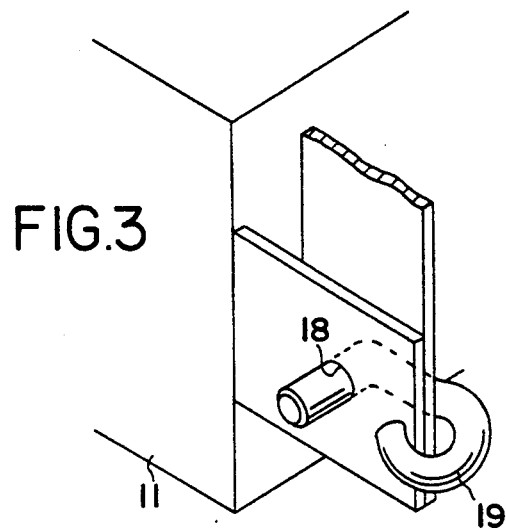

In FIG. 3, the reference number 11 designates a bottom board; 18 a hole for bottom-to-shell joint; and 19 a joint.

Figure 4:
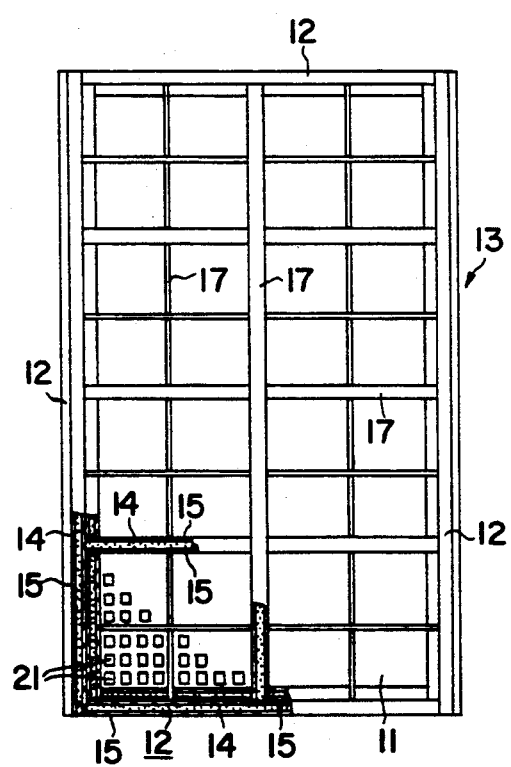
FIG. 4 presents a top view of a form unit having a partition.

In FIG. 4, the reference number 11 designates a heat-insulating bottom board; 12 a heat-insulating shell board; 13 a form unit of the invention; 14 a heat-insulating material such as foam plastic board; 15 a lagging material such as metal; 17 a heat-insulating partition; and 21 a facing material to be laid on the bottom, prior to casting cellular concrete paste.

Figure 5:
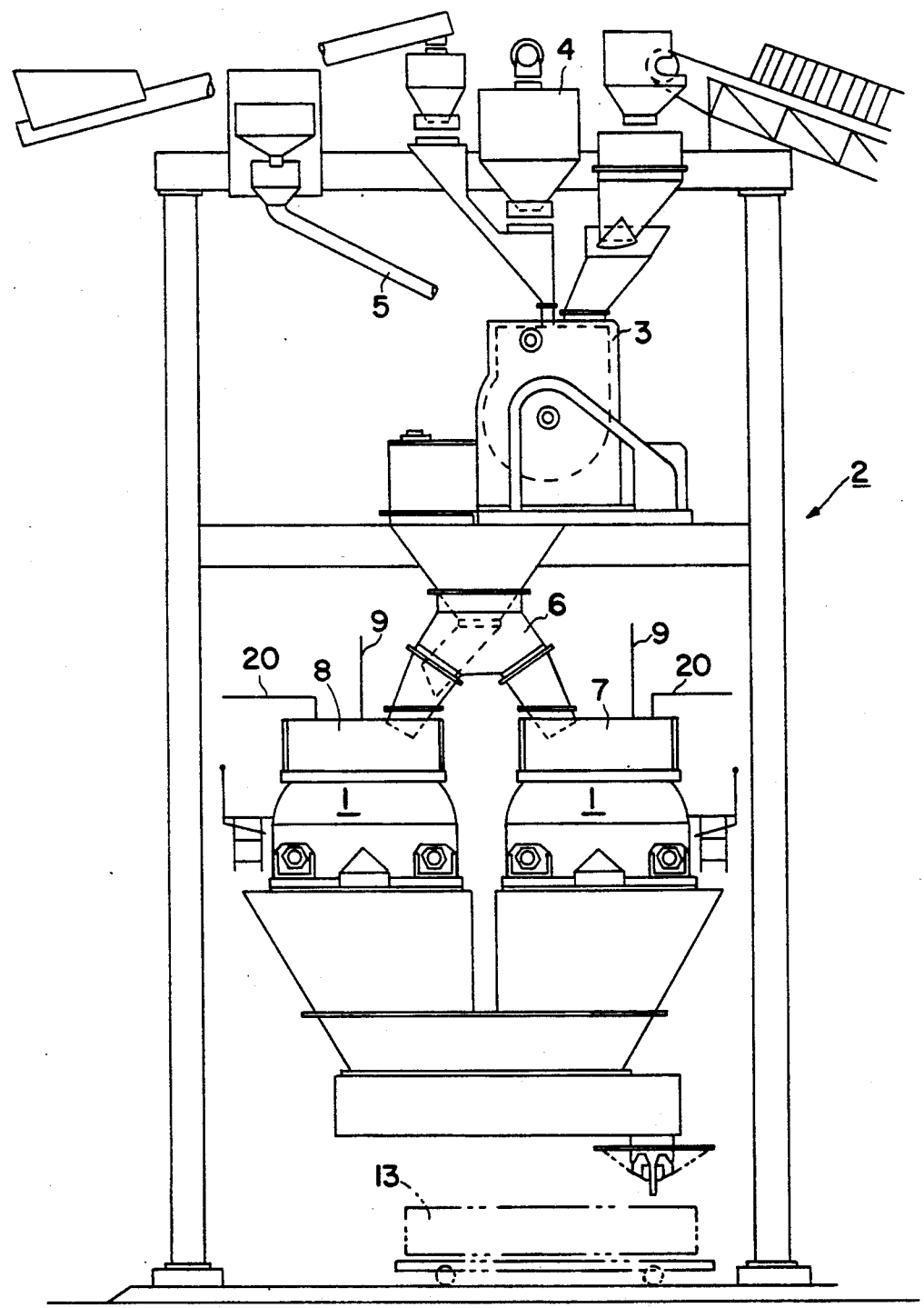
FIG. 5 shows a mixer unit used in the preparation of cellular concrete manufacture to be tested.

Cellular concrete manufactures were prepared using a mixer unit shown in FIG. 5.

EXAMPLE 1

In advance, the whole mixer unit was warmed by passing a hot water through the unit. Into the mixer 3 were fed 360 kg of Portland cement (Nippon Cement Co.) from the inlet 4 and 200 kg of warm water at a temperature of 60° C. from the inlet 5. The mixture was blended for 2 minutes and transferred through the connection 6 into the mixer 7. In the meantime, 20 kg of a warm frother solution (1.0 kg of a sulfate of higher alcohol, Foamix C:Hamano Kogyo Co., in 19 kg of water) which had been aerated by a bubble generator at a temperature of 60° C. was fed from the inlet 9. The mixture was blended for 5 minutes and casted into a form unit 13 shown in FIG. 1. At this time, the temperature of the cellular concrete paste was 55° C., which was determined by a L-type thermometer inserted into the center of the product. The form unit was piled up as shown in FIG. 1, allowed to stand for 5 hours at room temperature, and taken out from the form. The found temperature of the product 5 hours after the casting was 42° C.

EXAMPLE 2

A cellular concrete manufacture was prepared in the same manner as shown in Example 1, except that 50 g of zirconium was added into the mixer 7 from the inlet 20 during the addition of the bubbled warm frother solution.

CONTROL 1

A cellular concrete manufacture was prepared in the same manner as shown in Example 1, except that a prior art form having no heat-insulating walls was used.

The temperature and flexural strength of cellular concrete, 5 hours after the casting, were compared. The procedures and results are given in Table 1 and 2, respectively.

TABLE 1

| Example No. | Zirconium | Form |
| --- | --- | --- |
| Example 1 | none | Invention shown FIG. 1 |
| Example 2 | 50 g | Invention shown FIG. 1 |
| Control 1 | none | Prior art without insulation |

TABLE 2

| Example No. | Temperature Casting | Temperature 5 hours after | Flexural Strength (kg/cm$^2$) 5 hours after |
| --- | --- | --- | --- |
| Example 1 | 55° C. | 42° C. | 0.4 |
| Example 2 | 55° C. | 47° C. | 0.5 |
| Control 1 | 55° C. | 28° C. | 0.1 |

EXAMPLE 3

A cellular concrete paste was prepared in the same manner as shown in Example 1, except that the paste was casted into a form unit shown in FIG. 4. Prior to the casting, a facing material 21 was laid on the bottom board as shown in FIG. 4. The form unit containing the cellular concrete paste and facing material was piled up in the same manner as shown in FIG. 1 and allowed to stand for 5 hours at room temperature At this stage, the cellular concrete was sticked to the facing material The cellular concrete fastened to the facing material was taken out from the form and dried for 1 month at room temperature. It was found that the product was sufficiently serviceable The improvement when using the form device and process of the invention as compared with the control is evident from the above data Since many embodiments of the invention may be made without departing from the spirit and scope thereof, it is to be understood that the invention is not limited by the specific examples except to the extent defined in the following claims.

What is claimed is:

1. A form device for cellular concrete, consisting of a plurality of piled-up form units each having a heat-insulating bottom and shell, a heat-insulating top board, and a bottom-to-shell joint, the heat insulating members having a structure such that they are composed of a foam plastic board covered with a metal lagging material.

2. A form device according to claim 1 in which the form unit has a heat-insulating partition.

* * * * *